United States Patent [19]

Yoshida et al.

[11] Patent Number: 5,058,998
[45] Date of Patent: Oct. 22, 1991

[54] LIQUID CRYSTAL DISPLAY DEVIDE WITH A TWISTED ALIGNMENT STATE

[75] Inventors: Tetsushi Yoshida, Hachiooji; Tetsuo Muto, Tama; Toshiyuki Matsuda, Fussa; Naoshige Sugimoto, Hino, all of Japan

[73] Assignee: Casio Computer Co., Ltd., Tokyo, Japan

[21] Appl. No.: 405,466

[22] Filed: Sep. 11, 1989

[30] Foreign Application Priority Data

Sep. 16, 1988 [JP] Japan ................... 63-231766

[51] Int. Cl.$^5$ ............................................. G02F 1/13
[52] U.S. Cl. ............................... 359/63; 359/77;
  359/75; 359/93; 359/94; 359/92; 359/102
[58] Field of Search ............... 350/347 E, 337, 347 R, 350/340, 332, 347 V, 346, 350 R

[56] References Cited

U.S. PATENT DOCUMENTS

| | | | |
|---|---|---|---|
| 4,634,229 | 1/1987 | Amstutz et al. | 350/346 |
| 4,697,884 | 10/1987 | Amstutz et al. | 350/334 |
| 4,759,612 | 7/1988 | Nakatsuka et al. | 350/337 |
| 4,799,774 | 1/1989 | Baur et al. | 350/346 |
| 4,815,825 | 3/1989 | Nakagomi et al. | 350/346 |
| 4,886,344 | 12/1989 | Scheuble et al. | 350/347 E |
| 4,906,073 | 3/1990 | Hunahata et al. | 350/347 R |
| 4,909,605 | 3/1990 | Asano et al. | 350/346 |
| 4,930,877 | 6/1990 | Kano et al. | 350/347 E |
| 4,944,577 | 7/1990 | Yoshida et al. | 350/347 E |

FOREIGN PATENT DOCUMENTS

| | | | |
|---|---|---|---|
| 0234892A1 | 9/1987 | European Pat. Off. | 350/346 |
| 0260450A1 | 3/1988 | European Pat. Off. | 350/347 E |
| 0273443A1 | 7/1988 | European Pat. Off. | 350/337 |
| 62-31822 | 2/1987 | Japan | 350/337 |
| 62-80619 | 4/1987 | Japan | 350/337 |
| 62-80620 | 4/1987 | Japan | 350/337 |
| 62-80622 | 4/1987 | Japan | 350/337 |
| 62-89020 | 4/1987 | Japan | 350/337 |
| 62-129818 | 6/1987 | Japan | 350/337 |
| 62-144134 | 6/1987 | Japan | 350/346 |
| 62-153821 | 7/1987 | Japan | 350/347 E |
| 62-204230 | 9/1987 | Japan | 350/347 E |
| 62-266522 | 11/1987 | Japan | 350/337 |
| 62-279315 | 12/1987 | Japan | 350/337 |
| 63-6524 | 1/1988 | Japan | 350/337 |

OTHER PUBLICATIONS

The Optical Mode Interference Liquid-Crystal Display: M. Schadt et al., pp. 372-375, SID 87 Digest.
Electro-Optical Performance of a New, Black-White and Highly Multiplexable Liquid Crystal Display, pp. 236-238, M. Schadt et al., Appl. Phys. Lett. 50(5), Feb. 2, 1987.

Primary Examiner—Rolf Hille
Assistant Examiner—Minhloan Tran
Attorney, Agent, or Firm—Frishauf, Holtz, Goodman & Woodward

[57] ABSTRACT

A liquid crystal device has a pair of substrates having a plurality of electrodes arranged on facing surfaces thereof, aligning films, rubbed in a predetermined direction, for covering the surfaces of the substrates and the surfaces of the electrodes, a nematic liquid crystal disposed between these aligning films, and a pair of polarizing plates disposed outside the substrates. The liquid crystal device has an optical anistropy $\Delta n$ of 0.12 or below, a dielectric ratio $\Delta\epsilon/\epsilon_1$ of 1.0 or below, expressed by a ratio of a dielectric anistotropy $\Delta\epsilon$ of a dielectric constant in a direction normal to the axes of liquid crystal molecules, and a retardation $\Delta n \cdot d$ of greater than 0.4 $\mu$m and less than 1.0 $\mu$m, which is expressed by a product of the optical anisotropy $\Delta n$ and the thickness d of a liquid crystal layer. The nematic liquid crystal is twised 180° to 270° between the aligning films.

18 Claims, 8 Drawing Sheets

LIQUID CRYSTAL DISPLAY DEVIDE WITH A TWISTED ALIGNMENT STATE

BACKGROUND OF THE INVENTION

1. Field of the Invention

The present invention relates to a liquid crystal device using a nematic liquid crystal having twisted alignment state.

2. Description of the Related Art

Liquid crystal devices are widely used as display devices for television sets, wordprocessors, computer terminals, personal computers, etc. Liquid crystal devices are classified into a simple matrix type and an active matrix type. The former type has pixels formed respectively at points where electrodes arranged in row on one substrate and electrodes arranged in column on another substrate cross one another via a liquid crystal. The latter type has pixels formed respectively at positions where a common electrode formed on one substrate faces segment electrodes arranged on another substrate, and an active element (thin film transistor) is provided for each pixel.

For such matrix type liquid crystal display devices, there are demands for a large display and improvement of resolution. Therefore, the number of pixels arranged per display device is significantly increased. This demands recent liquid crystal devices to be driven in a high-duty multiplex manner.

A twisted nematic liquid crystal display device (hereinafter referred to as TN-LCD) which has a relatively high response speed and a relatively high contrast is used as a display device that, like a television set, displays motion pictures. This TN-LCD comprises a pair of substrates; a nematic liquid crystal sealed between the substrates with the directions of its molecular axes sequentially twisted 90° between the substrates; and polarizing plates respectively disposed outside the substrate pair. The 90° twisted arrangement is realized as follows. The inner surfaces of the pair of substrates facing each other with a given gap therebetween are subjected to aligning treatment. The aligning treatment comprises the steps of forming aligning films on the mentioned substrate surfaces in order to provide the nematic liquid crystal with alignment restrictive force, and rubbing the surfaces of the aligning films in order to align the axes of the liquid crystal molecules in a given direction. Accordingly, those of the liquid crystal molecules near the substrates of the aligning films have the molecular axes aligned to be nearly parallel to the rubbing direction. Hereinafter, the direction of the liquid crystal molecules aligned by the alignment restrictive force of the aligning treatment is defined as a aligning treatment direction. FIG. 1 illustrates the relation between the aligning treatment direction of the substrate pair and the polarizing axes (including an absorbing axis and a transmitting axis) of the polarizing plates disposed outside the substrates. In FIG. 1, as indicated by a broken arrow 3, the direction of aligning treatment of the lower substrate 1 is inclined 45° to the edge of the substrate 1, from the upper left of the substrate 1 in the diagram toward the lower right. As indicated by a solid arrow 4, the direction of aligning treatment of the upper substrate 2 is inclined 45° to the edge of the substrate 2, from the lower left (in the diagram) toward the upper right. With light being transmitted from the lower substrate toward the upper substrate 2, the aligning treatment direction of the upper substrate 2 differs 90° clockwise in the light-traveling direction (as viewed from the back of the diagram sheet) from that of the lower substrate 1.

As a result, the liquid crystal sealed between the lower substrate 1 and the upper substrate 2 is aligned in such a manner that the molecular axes are parallel to the broken arrow 3 at the proximity of the lower substrate 1, and are aligned in the direction of the solid arrow 4 at the proximity of the upper substrate 2. The middle liquid crystal molecules are aligned in such a manner that their axes are sequentially twisted counterclockwise, as viewed in the light-traveling direction. Therefore, the liquid crystal is aligned, twisted 90° counterclockwise between the lower and upper substrates 1 and 2. The direction of the polarizing axes (including an absorbing axis and a transmitting axis) of the polarizing plates disposed outside the substrates 1 and 2 is set as illustrated in FIG. 1. Specifically, the direction of the polarizing axis of the lower polarizing plate disposed outside the lower substrate 1 is set parallel to the aligning treatment direction of the lower substrate 1 as indicated by a broken arrow 5. The direction of the polarizing axis of the upper polarizing plate disposed outside the upper substrate 2 is set in a direction that crosses at 90° the direction of the polarizing axis of the lower polariz-ing plate, as indicated by a solid arrow 6. To enhance the contrast, $\Delta n \cdot d$, the product of the optical anisotropy $\Delta n$ of the liquid crystal and the layer thickness d (gap) thereof, is set nearly to 1.

The above-described TN-LCDs have a relatively flat spectral distribution, can attain a light transmitting state (open) in which the liquid crystal is hardly colored and a light shielding state (close), and has a relatively high contrast. Due to this feature, the TN-LCDs are widely used as various display devices. When the duty of multiplex drive becomes high (i.e., when the number of time divisions increases), however, the operation margin decreases, thus reducing the contrast. It is therefore difficult to provide a highduty multiplex drive for the TN-LCDs.

This reduction in operation margin in a TN-LCD occurs due to poor sharpness of the threshold characteristic of the TN-LCD (ratio of a change in luminance to the applied voltage; thereinafter referred to as $\gamma$ characteristic). The $\gamma$ characteristic can be improved by increasing the ratio of a change in aligning state to the applied voltage. To realize this, it has been proposed to increase the twist angle and decrease the elastic constant. As liquid crystal devices having the twist angle set to 180° to 360°, there are a super twisted nematic liquid crystal device (hereinafter referred to as STN-LCD) having a relatively small twist angle and a super birefringence effect liquid crystal device (hereinafter referred to as SBE-LCD) having a relatively large twist angle. The SBE-LCD is disclosed in U.S. Pat. No. 4,697,884 and U.S. Pat. No. 4,634,229. FIG. 2 illustrates the direction of aligning treatment of the substrate pair and the directions of the polarizing axes of the polarizing plates in the SBE-LCD. Referring to this diagram, the direction of the aligning treatment of a lower substrate 7 is inclined about 45° in the lower right direction to the lower edge of the substrate 7, as indicated by a broken arrow 8. The direction of the aligning treatment of an upper substrate 9 is deviated 270° clockwise from the arrow 8 (the direction of a solid arrow 10), as viewed from the back of the diagram sheet. Accordingly, the molecular axes of the molecules of the liquid crystal sealed between the two substrates is twisted 270° counterclockwise from the aligning treatment direction (broken arrow 8) of the lower substrate 7 toward the aligning treatment direction (solid arrow 10) of the upper substrate 9, as viewed from the back of the diagram sheet. The polarizing axis of the polarizing plate disposed outside the lower substrate 7 is set in a direction of a broken arrow 11, deviated 45° from the aligning treatment direction (broken arrow) of the substrate 7. The polarizing axis of the polarizing plate disposed outside the upper substrate 9 is set in a direction of a solid arrow 12, deviated 45° from the aligning treatment direction (solid arrow 10) of the substrate 9. Between both substrates is sealed a liquid crystal for which $\Delta n \cdot d$, the product of the optical anisotropy $\Delta n$ and the layer thickness d, is 0.78 μm or 0.84 μm.

As described above, the SBE-LCD and STN-LCD have the γ characteristic improved by increasing the twist angle and has the visual contrast enhanced by utilizing the double refraction birefringence effect. Due to their large twist angle, however, these two LCDs have a low response time. Because of the use of the double refraction birefringence effect, there would occur peaks in the spectral distribution of transmitting light, as shown in FIG. 6, due to the wavelength dependency of the refractive index, and the display face would be colored purplish blue in close state and yellowish green in open state, as indicated by the CIE chromaticity chart. Although this liquid crystal device is suitable for character display, therefore, it is not suitable for display of a motion picture such as a TV image. Nor is the liquid crystal device suitable for a color display.

To overcome the problems of the SBE-LCD and STN-LCD, it is proposed to prevent coloring of the display face by reducing the product $\Delta n \cdot d$ of the optical anisotropy $\Delta n$ of the liquid crystal sealed between the two substrates and the thickness d of the liquid crystal layer (hereinafter referred to as retardation $\Delta n \cdot d$). This liquid crystal device was reported as an optical mode interference effect liquid crystal device (hereinafter referred to as OMI-LCD) in Appl. Phys., lett. 50(2), 2 Feb. 1987, and SID DIGEST 1987, p. 372–375, by M. Schadt and F. Leenhouts, et al.

FIG. 3 illustrates the aligning treatment direction of the surfaces of a pair of substrates and the direction of polarizing axes of polarizing plates in this OMI-LCD. Referring to this diagram, the aligning treatment direction of a lower substrate 13 is the direction of a broken arrow 14 parallel to the lower edge of the substrate, and the aligning treatment direction of a upper substrate 15 is the direction of a solid arrow 16 parallel to the aligning treatment direction of the lower substrate 13. As a result, the liquid crystal sealed between both substrates has the molecular axes twisted 180° clockwise from the aligning treatment direction (broken arrow 14) of the lower substrate 13, as viewed from the back of the diagram sheet. The direction of the polarizing axis of the polarizing plate disposed outside the lower substrate 13 is set in the direction of a broken arrow 17 parallel to the aligning treatment direction (broken arrow 14) of the lower substrate 13. The direction of the polarizing axis of the polarizing plate disposed outside the upper substrate 15 is set in the direction of a solid arrow 18 normal to the direction of the polarizing axis of the lower polarizing plate (broken arrow 17). Between both substrates is sealed a liquid crystal having a retardation $\Delta n \cdot d$ of about 0.55 μm.

This OMI-LCD has $\Delta n \cdot d$ set significantly small in order to suppress coloring of the display face, thus ensuring achromatic color display. This OMI-LCD however has a low transmittivity in light-transmitting state to realize the achromatic color display and has a poor γ characteristic.

Various modifications of the STN-LCD and OMI-LCD have been proposed. Given that the aligning treatment direction of a lower substrate 19 in these LCDs is indicated by a broken arrow 20 and the direction of the aligning treatment direction of an upper substrate 21 is indicated by a solid arrow 22, as illustrated in FIG. 4, the twist angle α° of the liquid crystal sealed between these substrates is set between 160° and 360°; an angle α formed between the aligning treatment direction (broken arrow 20) of the lower substrate 19 and the direction of the polarizing axis of the lower polarizing plate disposed outside the substrate 19 (indicated by a broken arrow 23) is set between 0° and 110°; and with the direction of polarizing axis of the polarizing plate disposed outside the upper substrate 21 being indicated by a solid arrow 24, the crossing angle between the upper and lower polarizing plates is set between 0° and 90°. And a liquid crystal having a retardation $\Delta n \cdot d$ of 0.4 to 0.6 or 0.7 to 1.2 is sealed between the upper and lower substrates 21 and 19.

These LCDs are substantially the same as the aforementioned STN-LCD and/or OMI-LCD and still have the mentioned shortcomings: coloring of the display face and a low transmittivity or poor γ characteristic.

SUMMARY OF THE INVENTION

Accordingly, it is an object of this invention to provide a liquid crystal device which can avoid coloring of the display face, can ensure bright display and has a high γ characteristic.

To achieve the object, there is provided a liquid crystal device comprising:

a first substrate having a plurality of first electrodes arranged thereon;

a second substrate having at least one second electrode arranged thereon facing the first electrodes, the second substrate being coupled to the first substrate by means of a seal member to face the first substrate with a predetermined gap therebetween;

first aligning means for covering surfaces of the first electrodes and a surface of the first substrate and aligning molecules of a liquid crystal in a first direction;

second aligning means for covering a surface of the at least one second electrode and a surface of the second substrate and aligning molecules of the liquid crystal in a second direction differing 0° to 90° from the first direction toward a predetermined first rotational direction, as viewed in a traveling direction of transmitting light;

a nematic liquid crystal disposed between the first and second substrates, and having an optical anisotropy $\Delta n$ of 0.12 or below, a dielectric ratio $\Delta \epsilon / \epsilon_\perp$ of 1.0 or below, expressed by a dielectric anisotropy $\Delta \epsilon$ and a dielectric constant $\epsilon_\perp$ normal to a molecular axis, and a retardation $\Delta n \cdot d$ of greater than 0.4 μm and less than 1.0 μm, expressed by a product of the optical anisotropy $\Delta n$ and a liquid crystal thickness d, the nematic liquid crystal being twisted 180° to 270° between the first and second aligning means in the first rotational direction as viewed in the traveling direction of the transmitting light; and a pair of polarizing plates disposed outside a layer of the nematic liquid crystal.

As described above, according to the present liquid crystal device, the twist angle of molecular alignment of the liquid crystal disposed between a pair of substrates is set as large as 180° to 270°, and the retardation $\Delta n \cdot d$ is set greater than 0.4 and less than 1.0 with respect to light having a wavelength of 450 nm to 550 nm according to this twist angle. Accordingly, linearly polarized incident light with a long wavelength of a visible ray range comes out from the liquid crystal layer as elliptically polarized light due to a double refraction birefringence effect of the liquid crystal layer. Linearly polarized incident light with a short wavelength comes out from the liquid crystal layer as elliptically polarized light having the longitudinal axis rotated due to the double refraction birefringence effect of and the influence of optical rotatory power for rotating the polarization face. As a result, part (short-wave components) of the entire wavelength band of the visible rays of the outgoing light have the longitudinal axis of the elliptically polarized light rotated by the influence of the optical rotatory power, while the other part (long-wave components) of the wavelength band has that longitudinal axis not rotated. This reduces coloring of transmitting light which may be caused by the difference in optical rotatory angle for each wavelength due to the wavelength dependency of the refractive index (a change in refractive index caused by the wavelength of incident light). Therefore, the present liquid crystal device can ensure anchromatic color display and a high transmittivity in light-transmitting state to thereby provide a high brightness.

In addition, since the optical anisotropy $\Delta n$ of the liquid crystal is set equal to or less than 0.12, the wavelength dependency of the optical anisotropy of the liquid crystal is reduced, thus preventing coloring of transmitting light more surely.

The present liquid crystal device uses a liquid crystal which has a low dielectric ratio $\Delta \epsilon / \epsilon \perp$ of 1.0 or below, attained by dividing the dielectric anisotropy $\Delta \epsilon$ by the dielectric constant $\epsilon \perp$ in the direction normal to the longitudinal axis of the liquid crystal molecules. This reduces a change in effective voltage applied to the liquid crystal layer when the liquid crystal molecules behave between a pair of facing substrates, and improves the response time and the $\gamma$ characteristic.

Further, an angle between the aligning treatment direction of one of the substrates in the present liquid crystal device and the polarizing axis of the polarizing plate disposed outside this substrate, is set between 180° to 115° and an angle between the polarizing axes of a pair of polarizing plates is set between 90° and 20°. Therefore, the polarizing axes of the polarizing plate pair can be set to the most proper directions in accordance with the polarized state of light being transmitted through the liquid crystal, thus improving the contrast.

Since the thickness d of the liquid crystal layer in the present liquid crystal device is set equal to or less than 9 μm but equal to or greater than 4 μm, the intensity of an electric field applied to the liquid crystal layer is high, and a middle part of the liquid crystal layer whose molecular alignment is controlled by the electric field is larger than that portion of the liquid crystal layer at the proximity of both substrates whose molecular alignment is restricted by the alignment restrictive force. The present liquid crystal device therefore has an excellent sharpness and an excellent response speed.

Since the present liquid crystal device has a pretilt angle of 5° or below, a change in alignment of the liquid crystal molecules in electric-field applied state is increased, thus enhancing the sharpness, and the temperature dependency of the pre-tilt angle is decreased, thus ensuring stable alignment.

The above-described liquid crystal device of the present invention is driven in multiplexing manner. In this case the present liquid crystal device is driven by a drive signal for applying a bias voltage higher than a conventionally proper bias voltage attained by a theoretical computation and/or is driven by a drive signal having a frame frequency greater than the number of time divisions. The application of a high bias voltage and/or the use of a high-frequency drive signal reduce the transmittivity in light-shielding state and provide high contrast.

As described above, since the present liquid crystal device has a good $\gamma$ characteristic and can avoid coloring of the display face while maintaining a high contrast, it is suitable for displaying a motion picture as given by a television set.

DETAILED DESCRIPTION OF THE PREFERRED EMBODIMENTS

Preferred embodiments of this invention will now be described referring to the accompanying drawings.

Figure 8:
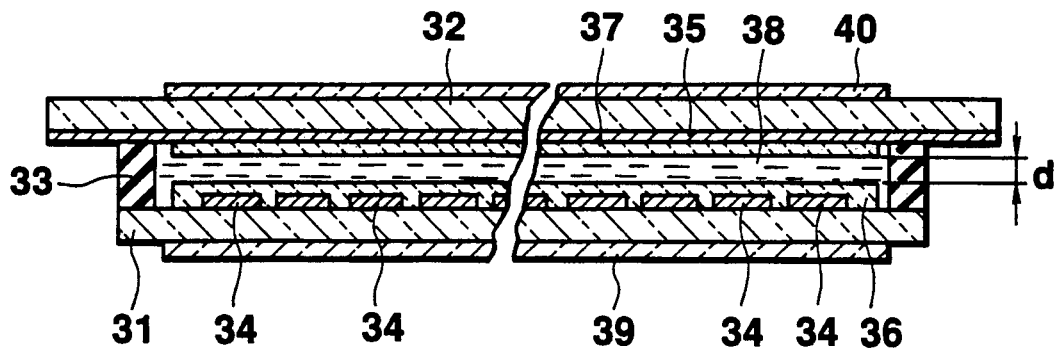
FIG. 8 is a cross-sectional view illustrating the structure of a liquid crystal device according to the present invention.

First, the structure of a liquid crystal device will be described. FIG. 8 illustrates a liquid crystal device of matrix display system utilized in displaying an image such as a television picture image. Referring to this diagram, numerals 31 and 32 denote a pair of transparent substrates adhered together by a seal member 33. A number of transparent stripe scanning electrodes 34 are formed on the upper surface of one of the substrates, e.g., the substrate 31 on the incident light side (the lower substrate in the diagram). A number of transparent stripe signal electrodes 35 facing and crossing the scanning electrodes 34 are formed on the lower surface of the substrate 32 on the outgoing light side (the upper substrate in the diagram). Those surfaces of the substrates 31, 32 which face each other are subjected to aligning treatment that comprises the steps of forming aligning films 36 and 37 on the facing surfaces of the substrates and rubbing the aligning films in one direction. Reference numeral 38 is a nematic liquid crystal sealed between the substrates 31, 32. Mixed in this liquid crystal is an optical activity material (e.g., chiral liquid crystal) for twisting the alignment of the liquid crystal molecules. The molecules of the liquid crystal 38 are twisted between the substrates 31, 32 with their directions being restricted by the aligning films 36, 37 and the rubbing direction. Reference numerals 39 and 40 are a pair of polarizing plates disposed on the outer surfaces of these substrates 31, 32. Although FIG. 8 illustrates a liquid crystal device of a simple matrix type, the liquid crystal device may be of an active matrix type whose individual pixel electrodes are driven by thin film transistors.

A description will now be given of the aligning treatment directions of both substrates 31, 32, the twisting direction of the alignment of the liquid crystal molecules and the directions of the polarizing axes (a transmitting axis and an absorbing axis) of the polarizing plates 39, 40 on the incident and outgoing light sides. In this example, the visible position F (see in FIG. 9A, 9B) of the liquid crystal device (direction that provides the highest contrast) is at the front edge side of the liquid crystal device.

Figure 9A:
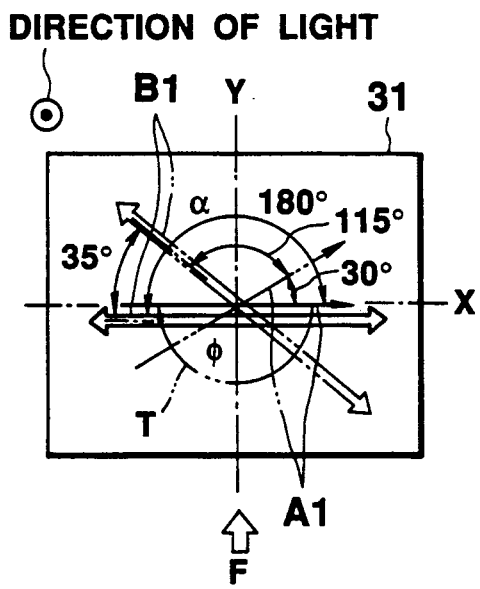
FIG. 9A is a plan view illustrating the relation between the aligning treatment direction of a substrate on the incident light side and the direction of the polarizing axis of a polarizing plate on the incident light side in the present liquid crystal device.
Figure 9B:
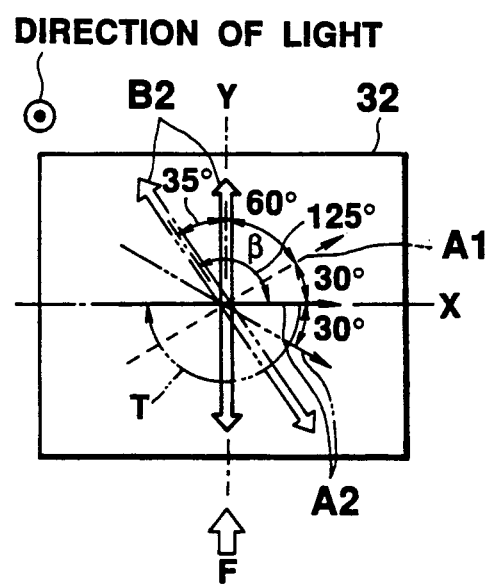
FIG. 9B is a plan view illustrating the relation between the aligning treatment direction of a substrate on the outgoing light side and the direction of the polarizing axis of a polarizing plate on the outgoing light side in the present liquid crystal device.

FIG. 9A illustrates an aligning treatment direction A1 of the incident-light side substrate 31 and the direction of the polarizing axis of the incident-light side polarizing plate 39. The aligning treatment direction A1 is set between a 30° range from the direction of the solid arrow parallel to the horizontal axis X of the substrate 31 to the chained-line arrow rotated 30° clockwise in the light-traveling direction (as viewed from the back of the diagram sheet; the rotational direction hereafter will be defined similarly) with the horizontal axis X as a reference. FIG. 9B illustrates an aligning treatment direction A2 of the outgoing-light side substrate 32 and the direction of the polarizing axis of the outgoing-light side polarizing plate 40. The aligning treatment direction A2 is set between a 30° range from the direction of the solid arrow parallel to the horizontal axis X of the substrate 32 to the chained-line arrow rotated 30° counterclockwise with the horizontal axis X as a reference. The aligning treatment direction A1 of the incident-light side substrate 31 crosses the aligning treatment direction A2 of the outgoing-light substrate 32 at an angle of 0° (parallel) to 60°. The nematic liquid crystal 38 sealed between both substrates 31, 32 has a levorotatory optical activity material mixed therein. The molecules of the liquid crystal 38 are aligned, twisted counterclockwise between the substrates 31, 32 between 180° (aligning treatment directions A1 and A2 being parallel to each other) at a minimum and 240° (aligning treatment directions A1 and A2 have a crossing angle of 60° at a maximum) at a maximum. Referring to FIGS. 9A and 9B, reference T indicates the twisting direction of the liquid crystal molecules (hereinafter referred to as liquid crystal twisting direction). Due to the levorotatory, the liquid crystal molecules are twisted counterclockwise from the substrate 31 to the substrate 32 (as viewed from the back of the diagram). As illustrated in FIG. 9A, a polarizing axial direction B1 of the incident-light side polarizing plate is set within a range deviated by an angle $\alpha$ in the opposite direction to the liquid crystal twisting direction T with respect to the aligning treatment direction A1 of the substrate 31 (a range from the solid arrow to the chained-line arrow). With a twist angle $\phi$ of the liquid crystal molecular alignment being 180°, the angle $\alpha$ is 180° to 145° (115°+30°), and with the twist angle $\phi$ being 240°, $\alpha$=150° (115°+35°) to 115°. As illustrated in FIG. 9B, a polarizing axial direction B2 of the outgoing-light side polarizing plate is set within a range deviated by an angle $\beta$ in the opposite direction to the liquid crystal twisting direction T with respect to the aligning treatment direction A1 of the substrate 31 (a range from the solid arrow to the chained-line arrow) in accordance with $\Delta n$ of the liquid crystal. With the twist angle $\phi$ of the liquid crystal molecular alignment being 180°, the angle $\beta$ is 125° to 90° (60°+30°), and with the twist angle $\phi$ being 240°, $\beta$=95° (60°+35°) to 60°. That is, the polarizing axial direction B1 of the incident-light side polarizing plate is set within the range of $\alpha$=180° to 115° with respect to the aligning treatment direction A1 of the substrate 31 in accordance with the twist angle and $\Delta n$. The polarizing axial direction B2 of the outgoing-light side polarizing plate 32 is set within the range of $\beta$=125° to 60° with respect to the aligning treatment direction A1 of the substrate 31. An angle $\psi$ between the polarizing axial direction B1 of the incident-light side polarizing plate and the polarizing axial direction B2 of the outgoing-light side polarizing plate is 90° to 20°.

The liquid crystal 38 used in the above liquid crystal device has an optical anisotropy $\Delta n$ of 0.12 or below for a wavelength of 540 nm to 550 nm. The retardation $\Delta n \cdot d$, the product of the optical anisotropy $\Delta n$ of the liquid crystal 38 and the thickness d of the liquid crystal layer (see FIG. 8), is set within a range of $0.4 < \Delta n \cdot d < 1.0$. This $\Delta n \cdot d$ should be preferably within a range of 0.5 to 0.9, and more preferably within a range of 0.6 to 0.8. The liquid crystal 38 has a dielectric ratio $\Delta\epsilon/\epsilon_\perp$ of 1.0 or below, which ratio is expressed by the ratio of the dielectric anisotropy $\Delta\epsilon$ to the dielectric constant $\epsilon_\perp$ normal to the axial direction of the liquid crystal molecules. Further, the thickness d of the liquid crystal layer is set to be 4 $\mu$m $\leq$ d $\leq$ 9 $\mu$m and the pre-tilt angle of the liquid crystal molecules at the proximity of the aligning films 36, 37 of the substrates 31, 32 is set equal to or less than 5°.

Since the twist angle $\phi$ of the alignment of the liquid crystal molecules between the substrate pair 31, 32 in the liquid crystal display device is set as large as 180° to 240°, an optical change caused when an electric field is applied to the liquid crystal is large. In addition, since the dielectric ratio $\Delta\epsilon/\epsilon_\perp$ of the liquid crystal 38 is set as small as 1.0 or below, there is a small change in dielectric constant when the liquid crystal molecules are aligned perpendicular to the substrates by the application of the electric field. Therefore, there is a small reduction in substantial voltage applied to the liquid crystal 38, and a high voltage can be applied to the liquid crystal 38. For a liquid crystal device having such a large twist angle and small $\Delta n \cdot d$, the adverse influence caused on the $\gamma$ characteristic by suppressing reduction in this impedance to a small amount to thereby apply a high voltage to the liquid crystal 38 is significantly greater than the adverse influence caused on the $\gamma$ characteristic by reducing the resilient constant of the liquid crystal in the conventional STN-LCD or the like. Therefore, the $\gamma$ characteristic is improved by the two features of increasing the twist angle and reducing the dielectric ratio $\Delta\epsilon/\epsilon_\perp$, thus providing a high contrast with respect to a high time-divisional drive. In this case, the dielectric ratio $\Delta\epsilon/\epsilon_\perp$ should preferably be small; particularly, it should preferably be 0.5 or below.

Figure 1:
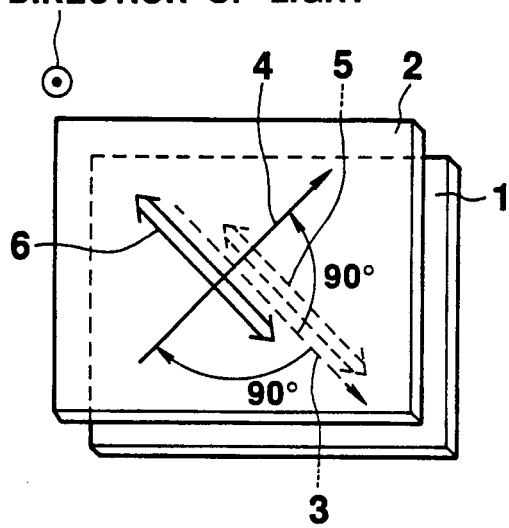
FIG. 1 is a schematic perspective view illustrating the relation between the aligning treatment direction and the direction of polarizing axis of a polarizing plate in a conventional TN-LCD.
Figure 2:
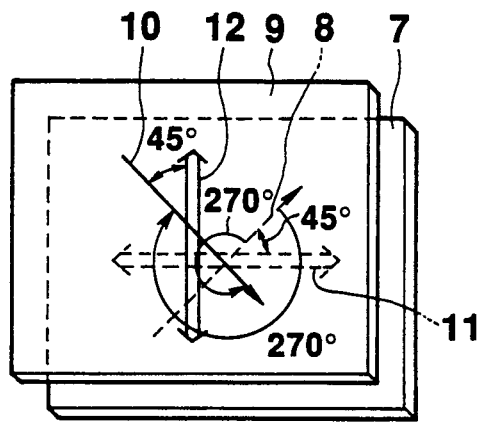
FIG. 2 is a schematic perspective view illustrating the relation between the aligning treatment direction and the direction of polarizing axis of a polarizing plate in a conventional STN-LCD.
Figure 3:
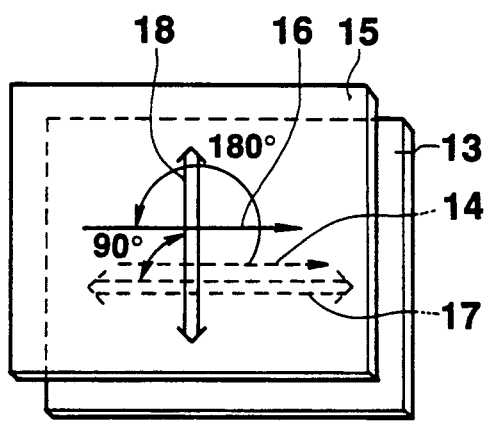
FIG. 3 is a schematic perspective view illustrating the relation between the aligning treatment direction and the direction of polarizing axis of a polarizing plate in a conventional OMI-LCD.
Figure 4:
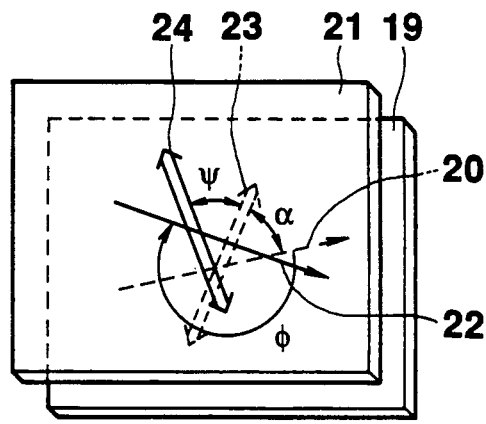
FIG. 4 is a schematic perspective view illustrating the relation between the aligning treatment direction and the direction of polarizing axis of a polarizing plate in a conventional liquid crystal device.
Figure 5:
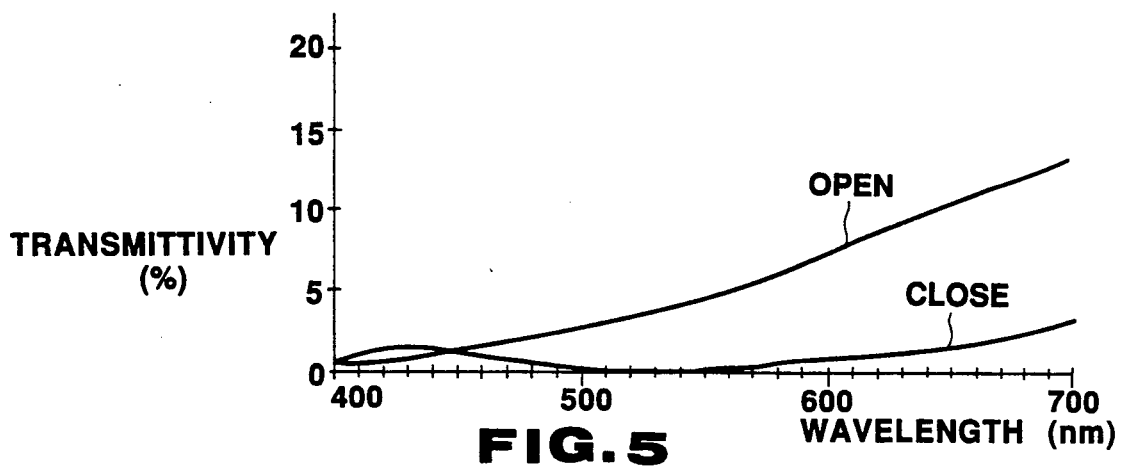
FIG. 5 is a spectral characteristic chart illustrating spectral distributions of transmitting light in open and close states in the TN-LCD shown in FIG. 1.
Figure 6:
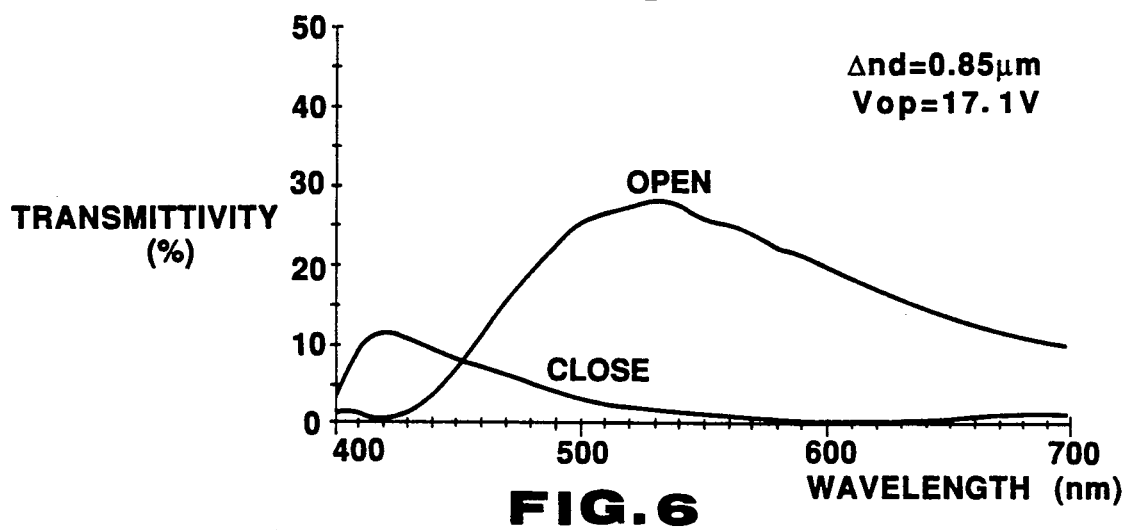
FIG. 6 is a spectral characteristic chart illustrating spectral distributions of transmitting light in open and close states in the STN-LCD shown in FIG. 2.
Figure 7:
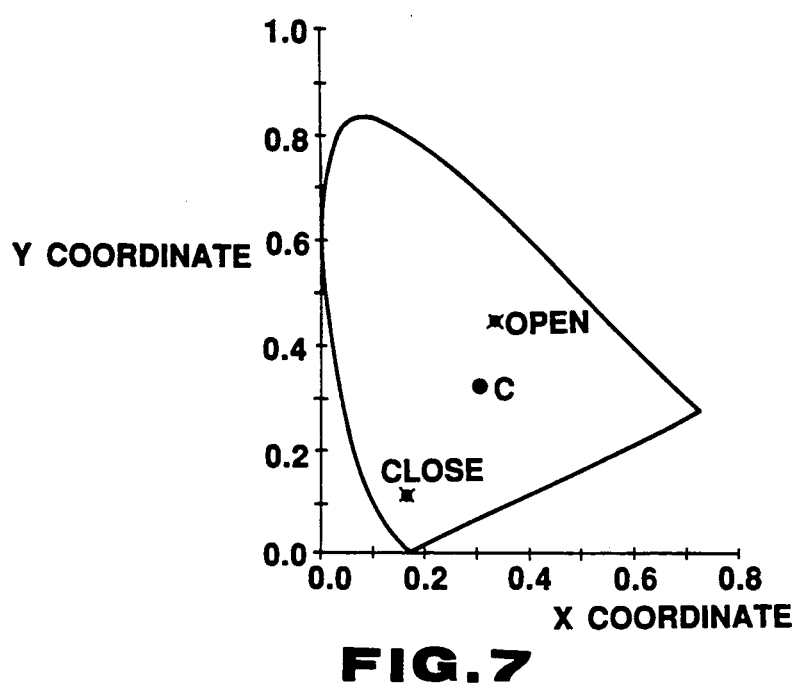
FIG. 7 is a CIE chromaticity chart illustrating the hue of transmitting light in open and close states in the TN-LCD shown in FIG. 1, which is attained on the basis of the spectral characteristic chart shown in FIG. 6.
Figure 10:
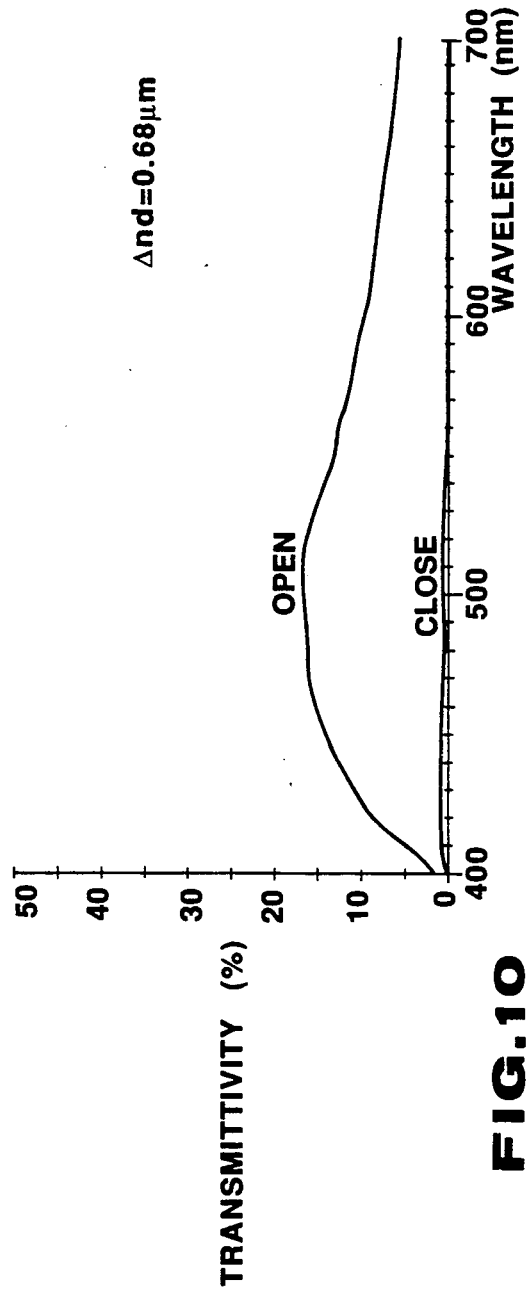
FIG. 10 is a spectral characteristic chart illustrating spectral distributions of transmitting light in open and close states in the present liquid crystal device.
Figure 11:
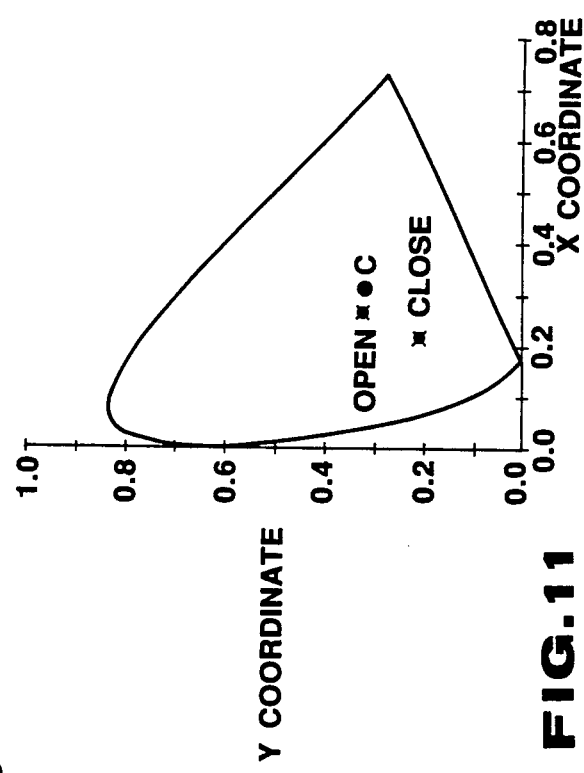
FIG. 11 is a CIE chromaticity chart illustrating the hue of transmitting light in open and close states in the present liquid crystal device, which is attained on the basis of the spectral characteristic shown in FIG. 10.

According to the above embodiment, the retardation $\Delta n \cdot d$ with respect to the light with substantially the middle wavelength ($\lambda$=540 nm to 550 nm) of a visible ray range is set within a range of 0.4 to 1.0 in accordance with the twist angle. In other words, the retardation $\Delta n \cdot d$ is set in such a way that there exist, in the visible ray range, a wavelength range to be influenced by the double refraction birefringence and a wavelength range to be influenced by rotatory. Accordingly, long-wave components of the linearly polarized incident light comes out from the liquid crystal layer as an elliptically polarized light due to the influence of the double refraction birefringence of the liquid crystal layer, and short-wave components of the incident light comes out from the liquid crystal as an elliptically polarized light with the longitudinal axis rotated by the influence of the double refraction birefringence of the liquid crystal layer and the influence of the optical rotatory power for rotating the polarization face. Since the incident light with a long wavelength is not influenced by the optical rotatory power, the difference in rotatory angle of each wavelength due to the wavelength dependence of the optical anisotropy $\Delta n$ is small. With respect to the light with a long wavelength, the longitudinal axis of the elliptically polarized light can be rendered almost coincident with that of the elliptically polarized light of the light having a short wavelength or rendered close to a circularly polarized light by adjusting $\Delta n \cdot d$. This can make the difference in transmittivity for the individual wavelengths smaller. The spectral distribution therefore becomes flat, thus ensuring anchromatic display. FIG. 10 illustrates the spectral characteristic in light-transmitting state (open) and light-shielding state (close) for the liquid crystal device of the above embodiment which has a twist angle $\phi$ of 200°, a retardation $\Delta n \cdot d$ of 0.68 μm and an liquid crystal's optical anisotropy $\Delta n$ of 0.093 (543 nm). FIG. 11 illustrates the hue in open and close states, attained on the basis of the spectral distribution in FIG. 10. As should be apparent from comparison between FIGS. 10 and 11 with FIGS. 6 and 7 referred to in the description of the conventional STN-LCD, according to this embodiment, the wavelength dependency of transmittivity is small and the spectral distribution curve is flat in open state, and the amount of leak light is small and the contrast is high in close state. As should be apparent from FIG. 11, according to the liquid crystal device of the above embodiment, the transmitting light in open and close states is close to the anchromatic point C, so that coloring of the transmitting light hardly occurs.

According to the liquid crystal display device, the angle $\alpha$ between the aligning treatment direction of one of the substrate pair and the polarizing axis of the polarizing plate disposed outside this substrate is set within a range of 180° to 115°, and the angle $\psi$ between the polarizing axes of the polarizing plate pair disposed outside the substrate pair is set within a range of 90° to 20°. Table 1 illustrates the results of measuring the contrast from the individual directions for a liquid crystal device having an angle $\alpha$ of 135° between the aligning treatment direction of the incident-light substrate 31 and the direction of polarizing axis (transmitting axis) of the incident-light side polarizing plate and an angle $\psi$ of 60° between the polarizing axes (transmitting axis) of the incident-light side polarizing plate and the outgoing-light polarizing plate, and a liquid crystal device having an angle $\alpha$ of 45° and an angle $\psi$ of 30°.

TABLE 1

| | | Present Invention | Compared Example |
|---|---|---|---|
| Angle of Polarizing Axis of Polarizing Plate | $\alpha$ | 135° | 45° |
| | $\psi$ | 60° | 30° |
| Contrast Vertical View Angle | −20° | 5.02 | 4.54 |
| | 10° | 11.5 | 9.83 |
| | 0° | 23.8 | 19.9 |
| | −10° | 28.8 | 26.6 |
| Horizontal View Angle | 10° | 11.3 | 10.8 |
| | 20° | 4.96 | 4.16 |

With the twist angle $\phi = 240°$, the vertical view angle is an angle with respect to a normal as viewed from the two-dimensionally upward or downward inclined direction; the upward inclined direction is indicated by (−). The horizontal view angle represents the direction horizontally inclined with respect to a normal. As should be obvious from Table 1, the liquid crystal device having the polarizing axis (transmitting axis) of the polarizing plate set as in the present invention provides higher contrast than the compared example. Since the polarizing axes of a pair of polarizing plates is set in the most proper direction in accordance with the polarized state of light passing through the liquid crystal layer, therefore, the transmittivity in light-transmitting state is high and the amount of leak light in light-shielding state can be minimized, thus providing a high contrast.

In a liquid crystal device, if the thickness d of the liquid crystal layer is greater than 9 μm, the electric field acting on the liquid crystal is weakened and the response time is reduced. With this thickness d being less than 4 μm, the sharpness of the optical change with respect to an electric change is impaired. This is because the alignment restrictive force of the substrates acts on the liquid crystal molecules at the proximity of the substrates, so that the alignment does not change even the electric field is applied to the liquid crystal.

The thickness of the liquid crystal layer, which does not change the alignment, exists however few it is, although it varies depending on the type of the liquid crystal and the aligning films on the substrate surface. With the thickness d of the liquid crystal layer being less than 4 μm, the ratio of the that portion of the thickness d of the liquid crystal layer, which causes a change in alignment in accordance with an electric field, to this thickness d is small. If the thickness d of the liquid crystal layer is set in this range, therefore, an optical change over the entire liquid crystal layer with respect to an electric change becomes smaller, thus impairing the sharpness of the electro-optical change. If this thickness d is set to be d≧4 μm as in the above embodiment, on the other hand, the layer thickness of the liquid crystal which does not cause a change in alignment with respect to an electric field (the liquid crystal near the substrates which is applied with the alignment restrictive force), is smaller than the layer thickness of the liquid crystal which cause such alignment change. This hardly reduces sharpness of the aforementioned electro-optical change. Since the thickness d of the liquid crystal layer in the above embodiment is set to be 4 μm≦d≦9 μm, the responsibility does not decrease so that the sharpness of the electro-optical change can be further increased.

If the tilt angle of the liquid crystal molecules at the proximity of the substrate surface is greater than 5°, the temperature dependency of the tilt angle increases and the alignment of the liquid crystal molecules becomes non-uniform, thus impairing the sharpness of the electro-optical change. According to the above embodiment, therefore, with the tilt angle of the liquid crystal molecules near the aligning films 36, 36 of the substrates 31, 32 being set equal to or less than 5°, the temperature dependency of the tilt angle can be reduced to thereby improve the stability of the tilt angle and the sharpness of the electro-optical change can be kept at a high level.

Although the twist angle $\phi$ of the aligned liquid crystal molecules between the substrate pair 31, 32 is set between 180° and 240° in the above embodiment, the same effects can be attained by setting the twist angle within a range of 180° to 270°.

According to the above embodiment, the polarizing axial direction B1 of the incident-light side polarizing plate is shifted in the opposite direction to the liquid crystal twisting direction T, with respect to the aligning treatment direction A1 of the incident-light side substrate 31. This polarizing axial direction B1 may be shifted in the same direction as the liquid crystal twisting direction T with respect to the aligning treatment direction A1. Further, the twisting direction T of the aligned liquid crystal molecules is not restricted to the counterclockwise direction; it may be the clockwise direction.

A description will now be given of specific examples according to the above-described embodiment.

To being with, the first embodiment having the twist angle φ being set to 180° will be described. With this twist angle, the aligning treatment direction A1 of the incident-light side substrate 31 is the same as the aligning treatment direction A2 of the outgoing-light side substrate 32. The polarizing axial direction (transmitting axial direction) B1 of the incident-light side polarizing plate is set within the range of α=160° to 180° with respect to the aligning treatment direction A1 of the substrate 31, and the polarizing axial direction (transmitting axial direction) B2 of the outgoing-light side polarizing plate is set within the range of β=90° to 110° with respect to the aligning treatment direction A1 of the substrate 31. The retardation Δn·d of the liquid crystal is set within a range of 0.5 μm to 0.7 μm.

Figure 12:
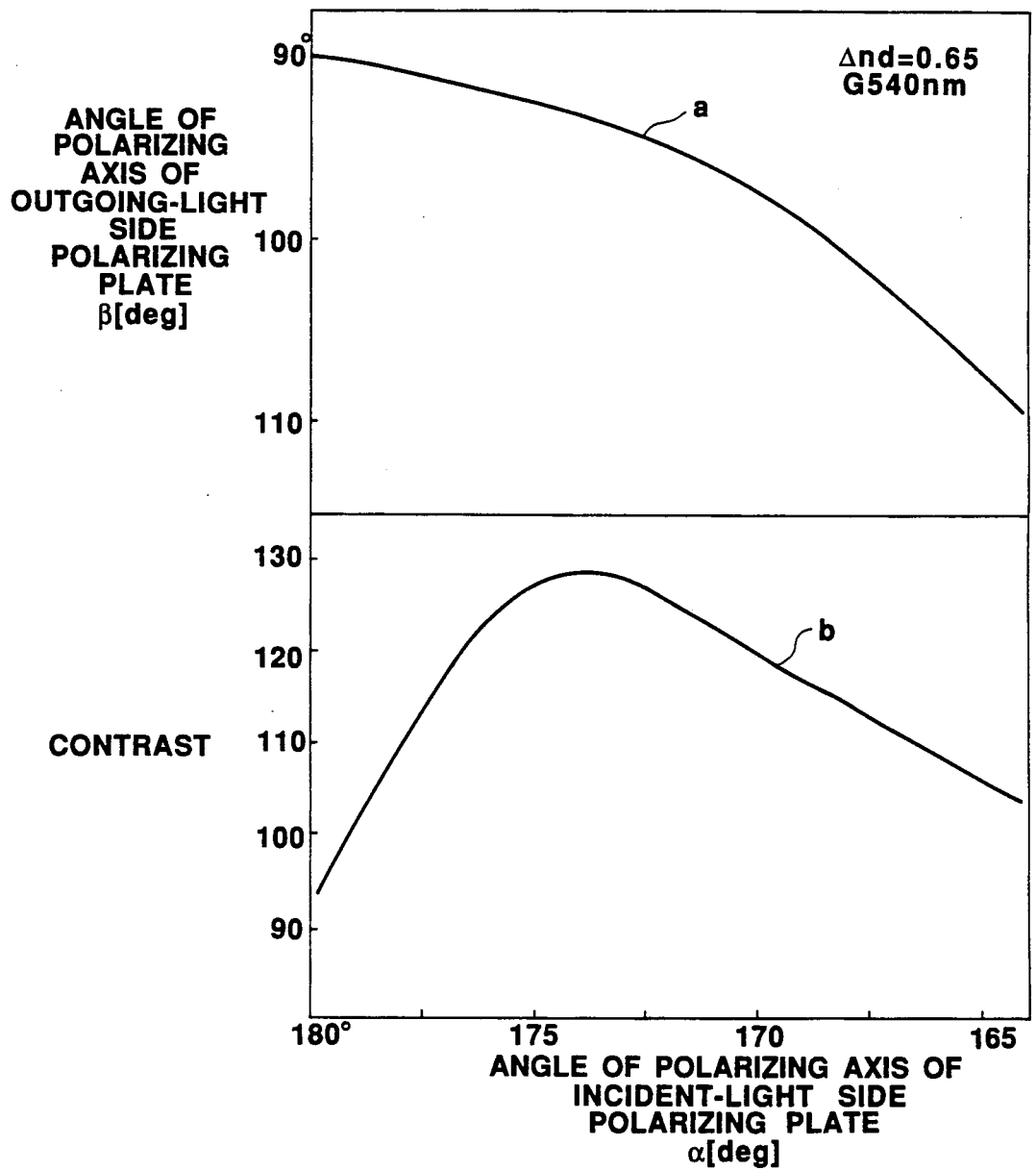
FIG. 12 is a graph illustrating the direction of the polarizing axis of the polarizing plate on the incident light side and a change in contrast with respect to the direction of the polarizing axis of the polarizing plate on the outgoing light side in the present liquid crystal device.

FIG. 12 illustrates the relation between the contrast and the angle between the polarizing axes of the incident-light side polarizing plate and the outgoing-light side polarizing plate in thus constituted liquid crystal device. In this diagram, a curve a represents the angle β of the polarizing axis of the outgoing-light side polarizing plate which ensures the highest contrast with respect to the angle α of the polarizing axis of the incident-light side polarizing plate when the liquid crystal device having a retardation Δn·d of 0.65 μm is driven at a 1/112 duty in multiplex manner using light with a wavelength of 540 nm (green). A curve b represents the values of the contrast in the above case. As should be apparent from FIG. 12, the contrast is 90 or above when the angle α of the polarizing axis of the incident-light side polarizing plate is in a range of 180° to 160° and the angle β of the polarizing axis of the outgoing-light side polarizing plate is within a range of 90° to 110°. The contrast is significantly higher than the one attained in the conventional TN-LCD or STN-LCD. The above relation between the angles α and β of the polarizing axes of the polarizing plates, and the contrast can be attained even if the retardation Δn·d is set within a range of 0.5 to 0.7 μm.

Table 2 illustrates the relation between the transmittivity, contrast and a Y value attained by multiplying the transmittivity by the visibility for each color light with respect to the retardation in this embodiment. For the purpose of comparison, Table 3 illustrates the relation between the transmittivity, contrast and a Y value for each color light in the conventional TN-LCD and STN-LCD. The numerals in Tables 2 and 3 indicate the measured values attained when the liquid crystal device is driven at 1/112 duty in multiplex manner.

TABLE 2

| | Example 1 | | | Example 2 | | | Example 3 | | |
|---|---|---|---|---|---|---|---|---|---|
| | Retardation (μm) | | | | | | | | |
| | 0.5 | | | 0.6 | | | 0.7 | | |
| | ON | OFF | CR | ON | OFF | CR | ON | OFF | CR |
| R 610 nm | 4.63 | 0.04 | 116 | 6.53 | 0.02 | 327 | 6.85 | 0.04 | 171 |
| G 540 nm | 6.41 | 0.06 | 107 | 6.83 | 0.04 | 171 | 10.80 | 0.09 | 120 |
| B 460 nm | 8.17 | 0.15 | 54.5 | 6.89 | 0.10 | 63.9 | 9.51 | 0.18 | 52.8 |
| Y value G 540 | 5.72 | 0.08 | 71.5 | 5.97 | 0.05 | 119 | 9.23 | 0.22 | 42.0 |

TABLE 3

| | (Comparative Data) | | | | | |
|---|---|---|---|---|---|---|
| | 90° TN - LCD | | | 240° STN - LCD | | |
| | Open | Close | CR | Open | Close | CR |
| R 610 nm | 3.99% | 0.05% | 79.8 | 20.15% | 0.29% | 69.5 |
| G 540 nm | 4.84 | 0.08 | 60.5 | 29.16 | 1.77 | 16.5 |
| B 460 nm | 4.47 | 0.13 | 34.4 | 26.95 | 7.03 | 3.8 |
| Y value G 540 | 5.68 | 0.46 | 12.3 | 24.69 | 1.78 | 13.9 |

As should be apparent from comparison between Tables 2 and 3, each example of this invention given in Table 2 provides a higher contrast and a flatter spectral distribution than the conventional TN-LCD and STN-LCD. The example 1 in Table 2 whose retardation Δn·d is 0.6 μm, has the highest contrast and highest Y value. The example 2 with a retardation Δn·d of 0.5 has a low value in open state with respect to red light so that display tends to become darker. For the example 3 with a retardation Δn·d of 0.7, the Y value shows a tendency to be impaired. With the twist angle of 180°, therefore, the retardation Δn·d is preferably within a range of 0.5 to 0.7 μm.

Another specific embodiment of the present invention will be described below referring to FIGS. 13 to 18.

Figure 13:
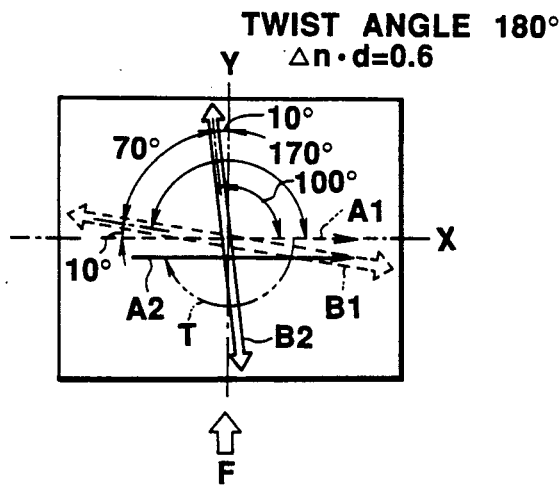
FIG. 13 is a plan view illustrating the aligning treatment directions of the substrate on the incident light side and outgoing light side, and the directions of the polarizing axes of the polarizing plates on the incident light side and outgoing light side, with a twist angle $\phi=180°$ and $\Delta n \cdot d = 0.6$ according to another embodiment of the present invention.

According to the second embodiment shown in FIG. 13, the twist angle φ of the aligned liquid crystal molecules is set to 180° and the retardation Δn·d to 0.6. The aligning treatment direction of the incident-light substrate 31 and the aligning treatment direction A2 of the outgoing-light substrate 32 are parallel to the horizontal axis X of the substrates. The polarizing axial direction B1 of the incident-light side polarizing plate is shifted 170° (=α) with respect to the aligning treatment direction A1 in the opposite direction to the liquid crystal twisting direction T. The polarizing axial direction B2 of the incident-light side polarizing plate is shifted 100° (=β) with respect to the aligning treatment direction A1 in the opposite direction to the liquid crystal twisting direction T. In this case, an angle ψ between the polarizing axial direction B1 of the incident-light side polarizing plate and the polarizing axial direction B2 of the outgoing-light side polarizing plate is 70°. The polarizing axial direction B1 is shifted 10° with respect to the horizontal axis X of the substrates in the same direction as the liquid crystal twisting direction T. The polarizing axial direction B2 is shifted 10° with respect to the vertical axis Y of the substrates in the opposite direction to the liquid crystal twisting direction T.

Figure 14:
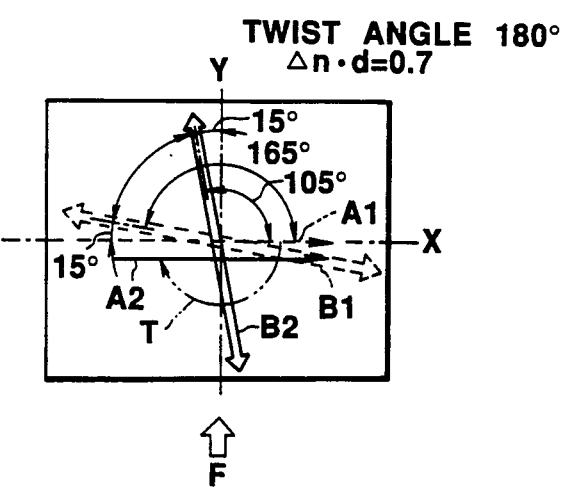
FIG. 14 is a plan view illustrating the aligning treatment directions of the substrate on the incident light side and outgoing light side, and the directions of the polarizing axes of the polarizing plates on the incident light side and outgoing light side, with a twist angle $\phi=180°$ and $\Delta n \cdot d = 0.7$ according to a different embodiment of the present invention.

According to the third embodiment shown in FIG. 14, the twist angle φ of the aligned liquid crystal molecules is set to 180° and the retardation Δn·d to 0.7. The aligning treatment direction of the incident-light substrate 31 and the aligning treatment direction A2 of the outgoing-light substrate 32 are the same as those shown in FIG. 13. The polarizing axial direction B1 of the incident-light side polarizing plate is shifted 165° (=α) with respect to the aligning treatment direction A1 in the opposite direction to the liquid crystal twisting direction T. The polarizing axial direction B2 of the incident-light side polarizing plate is shifted 105° ($=\beta$) with respect to the aligning treatment direction A1 in the opposite direction to the liquid crystal twisting direction T. In this case, an angle $\psi$ between the polarizing axial direction B1 of the incident-light side polarizing plate and the polarizing axial direction B2 of the outgoing-light side polarizing plate is 60°. The polarizing axial direction B1 is shifted 15° with respect to the horizontal axis X of the substrates in the same direction as the liquid crystal twisting direction T. The polarizing axial direction B2 is shifted 15° with respect to the vertical axis Y of the substrates in the opposite direction to the liquid crystal twisting direction T.

Figure 15:
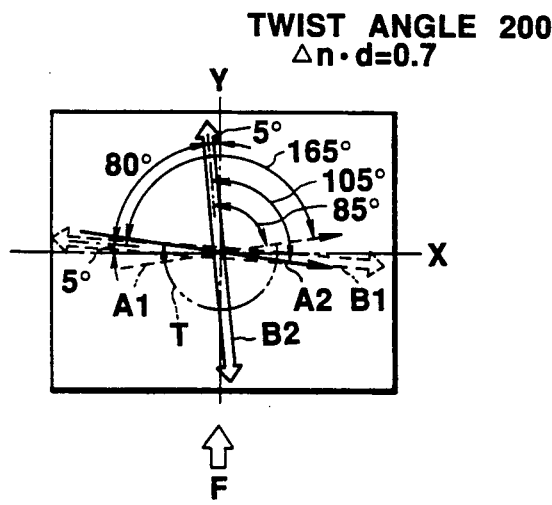
FIG. 15 is a plan view illustrating the aligning treatment directions of the substrate on the incident light side and outgoing light side, and the directions of the polarizing axes of the polarizing plates on the incident light side and outgoing light side, with a twist angle $\phi=200°$ and $\Delta n \cdot d = 0.7$ according to a further embodiment of the present invention.

According to the fourth embodiment shown in FIG. 15, the twist angle $\phi$ of the aligned liquid crystal molecules is set to 200° and the retardation $\Delta n \cdot d$ to 0.7. The aligning treatment direction of the incident-light substrate 31 and the aligning treatment direction A2 of the outgoing-light substrate 32 are respectively shifted 10° in the opposite directions with respect to the horizontal direction X of the substrates. The polarizing axial direction B1 of the incident-light side polarizing plate is shifted 165° ($=\alpha$) with respect to the aligning treatment direction A1 in the opposite direction to the liquid crystal twisting direction T. The polarizing axial direction B2 of the incident-light side polarizing plate is shifted 85° ($=\beta$) with respect to the aligning treatment direction A1 (105° with respect to the aligning treatment direction A2) in the opposite direction to the liquid crystal twisting direction T. In this case, an angle $\psi$ between the polarizing axial direction B1 of the incident-light side polarizing plate and the polarizing axial direction B2 of the outgoing-light side polarizing plate is 80°. The polarizing axial direction B1 is shifted 5° with respect to the horizontal axis X of the substrates in the same direction as the liquid crystal twisting direction T. The polarizing axial direction B2 is shifted 5° with respect to the vertical axis Y of the substrates in the opposite direction to the liquid crystal twisting direction T.

Figure 16:
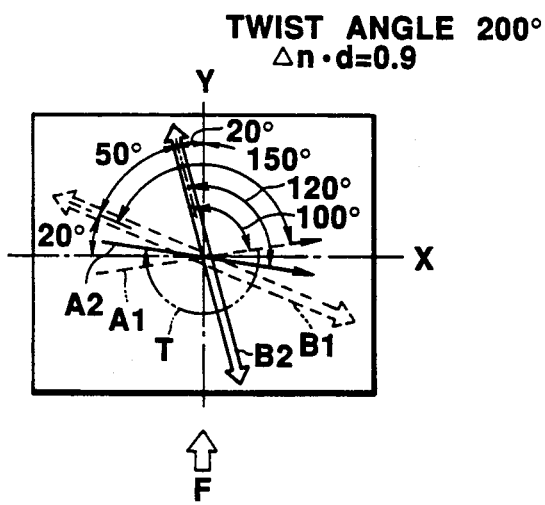
FIG. 16 is a plan view illustrating the aligning treatment directions of the substrate on the incident light side and outgoing light side, and the directions of the polarizing axes of the polarizing plates on the incident light side and outgoing light side, with a twist angle $\phi=200°$ and $\Delta n \cdot d = 0.9$ according to a still further embodiment of the present invention.

According to the fifth embodiment shown in FIG. 16, the twist angle $\phi$ of the aligned liquid crystal molecules is set to 200° and the retardation $\Delta n \cdot d$ to 0.9. The aligning treatment direction of the incident-light substrate 31 and the aligning treatment direction A2 of the outgoing-light substrate 32 are the same as those shown in FIG. 15. The polarizing axial direction B1 of the incident-light side polarizing plate is shifted 150° ($=\alpha$) with respect to the aligning treatment direction A1 in the opposite direction to the liquid crystal twisting direction T. The polarizing axial direction B2 of the incident-light side polarizing plate is shifted 100° ($=\beta$) with respect to the aligning treatment direction A1 (120° with respect to the aligning treatment direction A2) in the opposite direction to the liquid crystal twisting direction T. In this case, an angle $\psi$ between the polarizing axial direction B1 of the incident-light side polarizing plate and the polarizing axial direction B2 of the outgoing-light side polarizing plate is 50°. The polarizing axial direction B1 is shifted 20° with respect to the horizontal axis X of the substrates in the same direction as the liquid crystal twisting direction T. The polarizing axial direction B2 is shifted 20° with respect to the vertical axis Y of the substrates in the opposite direction to the liquid crystal twisting direction T.

Figure 17:
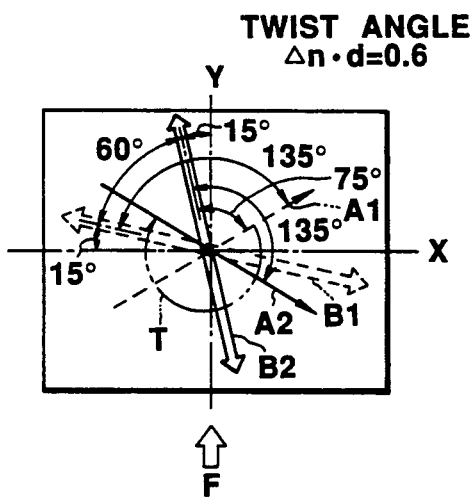
FIG. 17 is a plan view illustrating the aligning treatment directions of the substrate on the incident light side and outgoing light side, and the directions of the polarizing axes of the polarizing plates on the incident light side and outgoing light side, with a twist angle $\phi=240°$ and $\Delta n \cdot d = 0.6$ according to a still another embodiment of the present invention.

According to the sixth embodiment shown in FIG. 17, the twist angle $\phi$ of the aligned liquid crystal molecules is set to 240° and the retardation $\Delta n \cdot d$ to 0.6. The aligning treatment direction of the incident-light substrate 31 and the aligning treatment direction A2 of the outgoing-light substrate 32 are respectively shifted 30° in the opposite directions with respect to the horizontal direction X of the substrates. The polarizing axial direction B1 of the incident-light side polarizing plate is shifted 135° ($=\alpha$) with respect to the aligning treatment direction A1 in the opposite direction to the liquid crystal twisting direction T. The polarizing axial direction B2 of the incident-light side polarizing plate is shifted 75° ($=\beta$) with respect to the aligning treatment direction A1 (135° with respect to the aligning treatment direction A2) in the opposite direction to the liquid crystal twisting direction T. In this case, an angle $\psi$ between the polarizing axial direction B1 of the incident-light side polarizing plate and the polarizing axial direction B2 of the outgoing-light side polarizing plate is 60°. The polarizing axial direction B1 is shifted 15° with respect to the horizontal axis X of the substrates in the same direction as the liquid crystal twisting direction T. The polarizing axial direction B2 is shifted 15° with respect to the vertical axis Y of the substrates in the opposite direction to the liquid crystal twisting direction T.

Figure 18:
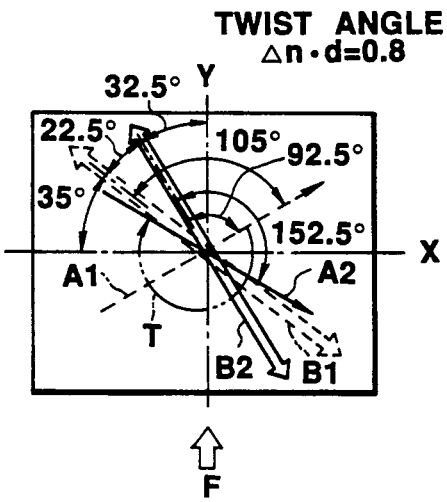
FIG. 18 is a plan view illustrating the aligning treatment directions of the substrate on the incident light side and outgoing light side, and the directions of the polarizing axes of the polarizing plates on the incident light side and outgoing light side, with a twist angle $\phi=240°$ and $\Delta n \cdot d = 0.8$ according to a still different embodiment of the present invention.

According to the seventh embodiment shown in FIG. 18, the twist angle $\phi$ of the aligned liquid crystal molecules is set to 240° and the retardation $\Delta n \cdot d$ to 0.8. The aligning treatment direction of the incident-light substrate 31 and the aligning treatment direction A2 of the outgoing-light substrate 32 are the same as those shown in FIG. 17. The polarizing axial direction B1 of the incident-light side polarizing plate is shifted 115° ($=\alpha$) with respect to the aligning treatment direction A1 in the opposite direction to the liquid crystal twisting direction T. The polarizing axial direction B2 of the incident-light side polarizing plate is shifted 92.5° ($=\beta$) with respect to the aligning treatment direction A1 (152.5° with respect to the aligning treatment direction A2) in the opposite direction to the liquid crystal twisting direction T. In this case, an angle $\psi$ between the polarizing axial direction B1 of the incident-light side polarizing plate and the polarizing axial direction B2 of the outgoing-light side polarizing plate is 22.5°. The polarizing axial direction B1 is shifted 35° with respect to the horizontal axis X of the substrates in the same direction as the liquid crystal twisting direction T. The polarizing axial direction B2 is shifted 32.5° with respect to the vertical axis Y of the substrates in the opposite direction to the liquid crystal twisting direction T.

The following will describe how to drive the liquid crystal devices of the above embodiments.

Figure 19:
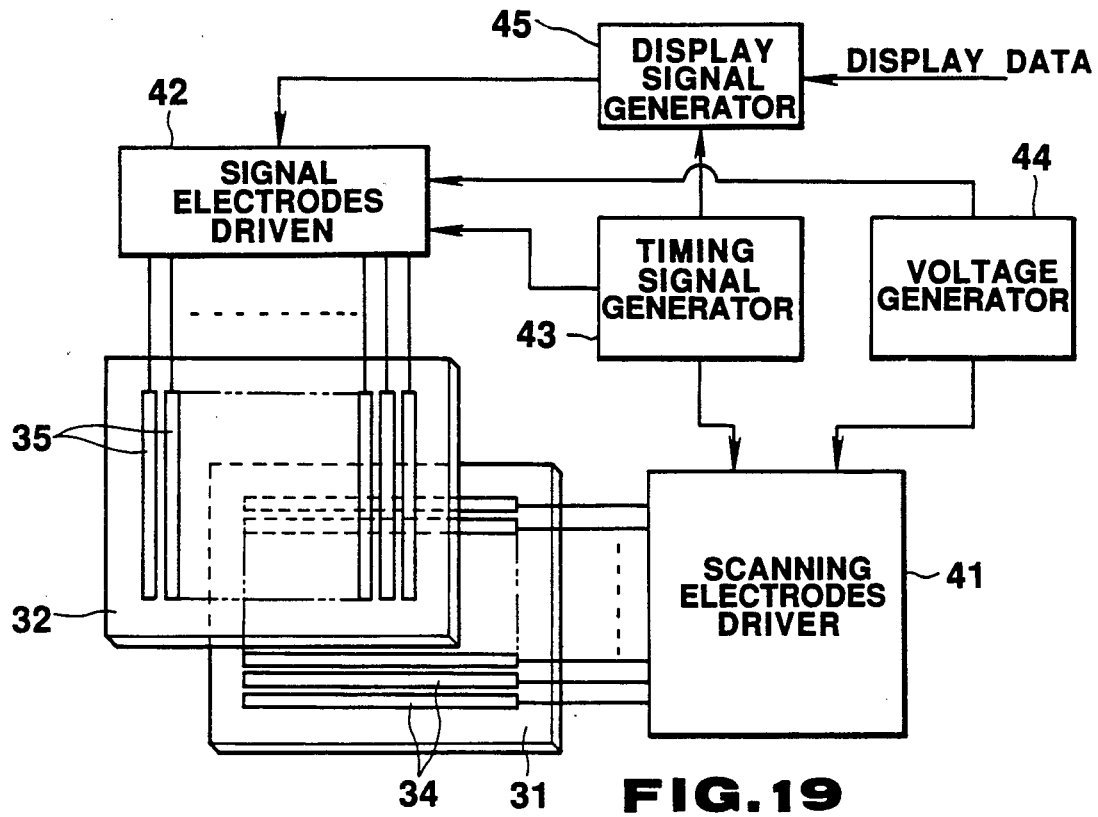
FIG. 19 is a block diagram schematically illustrating the arrangement of a driver for driving a liquid crystal device embodying the present invention.

The liquid crystal device having the above-described structure is driven in multiplex manner by the driver shown in FIG. 19.

The scanning electrodes 34 arranged on the incident-light side substrate 31 are connected to a scanning electrode driver 41. The signal electrodes 35 arranged on the outgoing-light side substrate 32 are connected to a signal electrode driver 42. The scanning electrode driver 42 receives a timing signal from a timing signal generator 43 and a plurality of source voltages from a voltage generator 44. The scanning electrode driver 41 sequentially supplies scanning signals with the desired frame frequency (e.g., 60 Hz or 120 Hz) to the individual scanning electrodes 34 at predetermined delayed timings. The signal electrode driver 42 receive a timing signal from the timing signal generator 43 and a plurality of source voltages from the voltage generator 44.

Figure 20A:
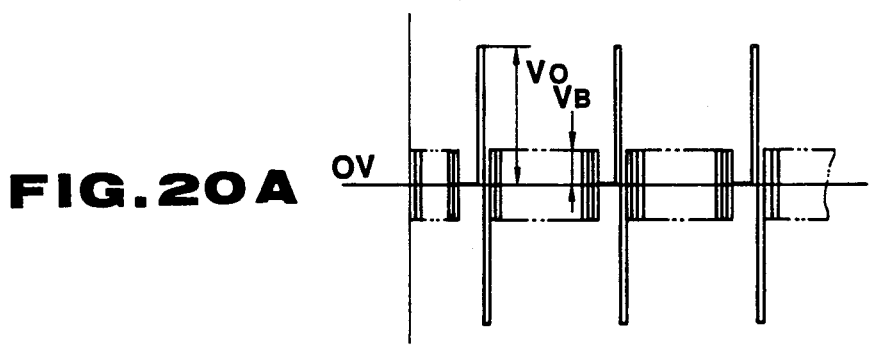
FIG. 20A is a voltage waveform diagram illustrating a voltage at a selected element applied between signal electrodes and scanning electrodes facing each other via a liquid crystal in the present liquid crystal device.
Figure 20B:
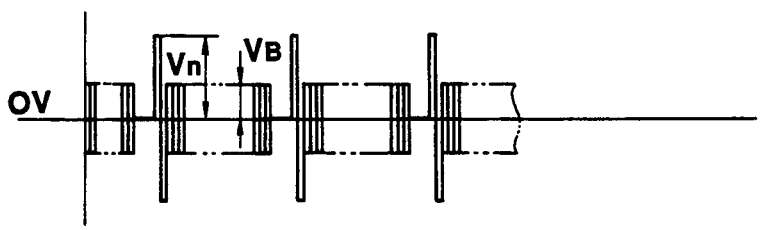
FIG. 20B is a voltage waveform diagram illustrating a voltage at a half-selected element applied between the signal electrodes and scanning electrodes facing each other via the liquid crystal in the present liquid crystal device.
Figure 20C:
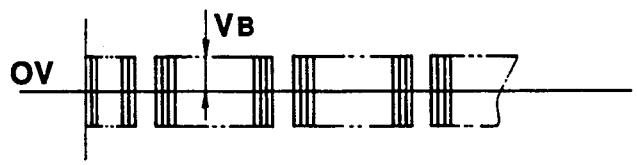
FIG. 20C is a voltage waveform diagram illustrating a voltage at an unselected element applied between the signal electrodes and scanning electrodes facing each other via the liquid crystal in the present liquid crystal device.

This driver 42 supplies select or non-select signals synchronous with the scanning signals, to the signal electrodes in accordance with a display signal output from a display signal generator 45. The display signal generator 45 receives display data supplied from the outside of a display device shown in FIG. 19, generates a display signal synchronous with the timing signal from the timing signal generator 43 and supplies it to the signal electrode driver 42. Accordingly, those portions where the signal electrodes 35 cross the scanning electrodes 34 are arbitrarily selected by the select signal supplied to the signal electrodes 35 and the desired pattern would be displayed. A high operation voltage $V_O$ is applied between signal and scanning electrodes at selected elements during a select period as shown in FIG. 20A and a bias voltage $V_B$ is applied during other non-select period. A non-operation voltage $V_n$ lower than a threshold voltage is applied between signal and scanning electrodes at other crossing points (half-selected elements) at the same row and column of the selected crossing portion during a select period as shown in FIG. 20B. The bias voltage $V_B$ is applied to unselected elements as shown in FIG. 20C.

The present liquid crystal device is driven in the above-described multiplex manner when applied with such a bias voltage that can provide a bias ratio greater than the conventionally proper bias ratio attained by theoretical computation that has theoretically been supposed to be able to maximize the operation margin and/or by the scanning signals and driving signals having a frame frequency higher than those associated with the time division. That is, with N being the number of time divisions, the bias ratio A of the present invention should satisfy the following condition:

$$A = \frac{V_{seg}}{V_{seg} + V_{com}} > \frac{1}{\sqrt{N+1}}$$

The frame frequency in this embodiment is an integer multiple (e.g., twice) of the conventionally proper frame frequency.

Figure 21B:
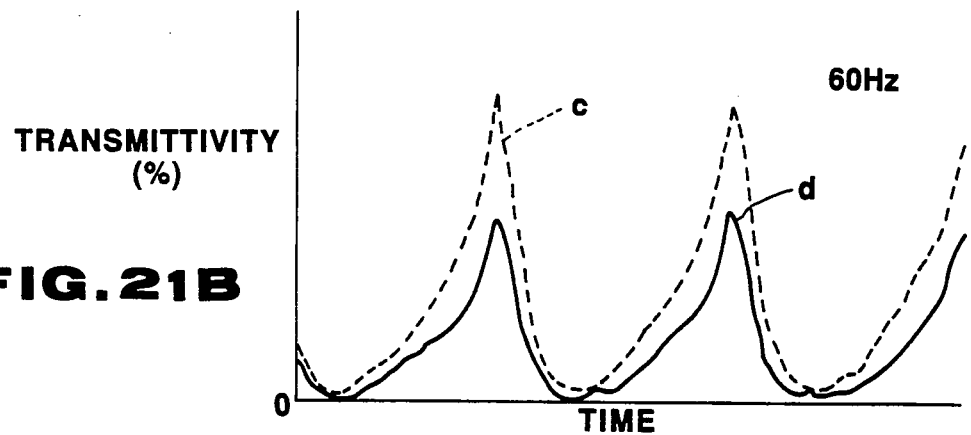
FIG. 21B is a transmittivity characteristic diagram illustrating a change in light transmittivity when the voltage having the waveform shown in FIG. 21A is applied to a liquid crystal.
Figure 21A:
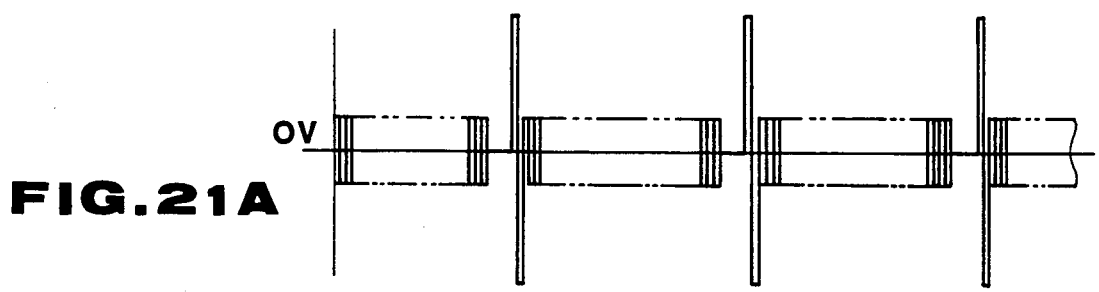
FIG. 21A is a waveform diagram of an applied voltage in ON state where the present liquid crystal device is driven by a drive signal having a frame frequency of 60 Hz.
Figure 22B:
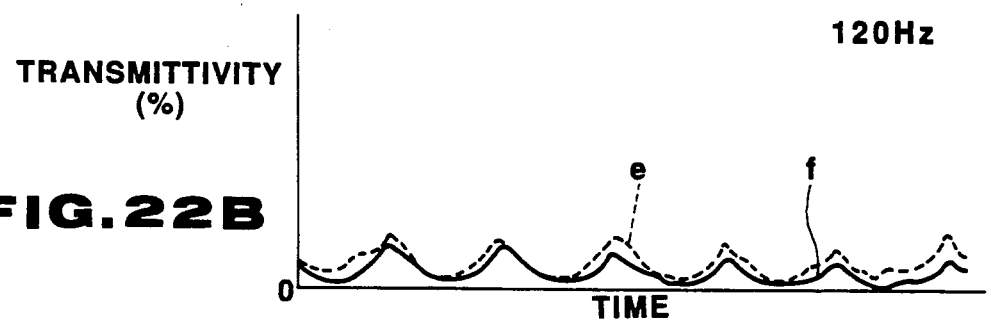
FIG. 22B is a transmittivity characteristic diagram illustrating a change in light transmittivity when the voltage having the waveform shown in FIG. 22A is applied to a liquid crystal.
Figure 22A:
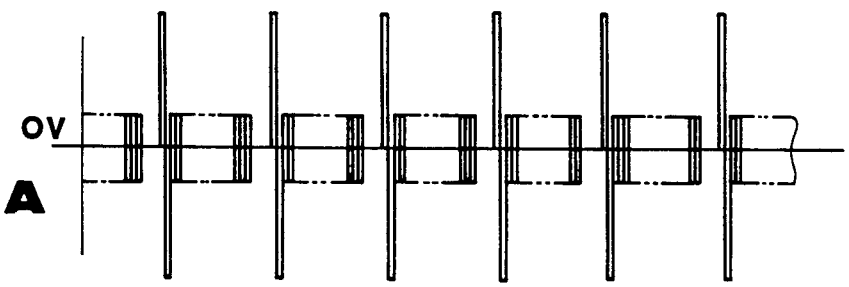
FIG. 22A is a waveform diagram of an applied voltage in ON state where the present liquid crystal device is driven by a drive signal having a frame frequency of 120 Hz.

FIG. 21A illustrates the waveform of a drive voltage applied when the liquid crystal device is actually driven with the frame frequency of 60 Hz in the above driving method. FIG. 21B illustrates the transmittivity characteristic in that case. FIG. 22A illustrates the waveform of a drive voltage applied when the liquid crystal device is actually driven with the frame frequency of 120 Hz. FIG. 22B illustrates the transmittivity characteristic in that case. As should be apparent from FIGS. 21B and 22B, curves d and f showing the transmittivity characteristic for the present case where the liquid crystal device is driven by a drive voltage with a higher bias ratio, have a less amount of leak light in light-shielding state than curves c and e showing the transmittivity characteristic for a case where the liquid crystal device is driven by the conventionally proper bias. In addition, the amount of leak light is significantly small in a case where the liquid crystal device is driven with the frame frequency of 120 Hz as compared with a case where the frame frequency is 60 Hz.

Table 4 illustrates the contrasts when liquid crystal devices having different twist angles are driven by the above drive voltage. In this case these devices are driven at 1/120 duty in multiplex manner and the measured temperature is 27° C.; the contrasts for the conventional case are also given for a comparative purpose.

TABLE 4

|  | Prior Art | Example 4 | Example 5 | Example 6 |
|---|---|---|---|---|
| Frame Frequency | 60 Hz | 60 Hz | 120 Hz | 120 Hz |
| Bias Ratio | 1/12 Bias | 1/9 Bias | 1/12 Bias | 1/9 Bias |
| Twist Angle |  |  |  |  |
| 160° | 4.0 | 5.0 | 5.0 | 5.5 |
| 180° | 7.0 | 9.0 | 8.0 | 10.5 |
| 200° | 13.0 | 16.0 | 13.0 | 18.0 |
| 210° | 9.0 | 10.0 | 11.0 | 13.5 |
| 220° | 9.0 | 12.0 | 13.5 | 18.0 |
| 240° | 7.0 | 8.0 | 7.5 | 9.0 |

As should be apparent from Table 4, the greater the bias ratio, the higher the contrast, and the higher the frame frequency, the higher the contrast.

As described above, the present liquid crystal device has the $\gamma$ characteristic significantly improved due to a large twist angle. Although the operation margin is reduced by setting the bias ratio greater than the conventionally proper level as done in the above drive voltage, the contrast becomes higher as the amount of leak light in light-shielding state is smaller. If the bias ratio is further increased, the liquid crystal molecules at the selected elements, which are controlled to be in light-shielding state, are aligned more perpendicular to the substrates, thus reducing the amount of leak light. The reduction in operation margin, however, lowers the transmittivity when the liquid crystal molecules are controlled to be in light-transmitting state. As the bias ratio is increased, therefore, the highest contrast would be found. Accordingly, the bias ratio can be increased within a range whose upper limit corresponds to the highest contrast.

More specific examples of the above-described present invention will now be explained. Table 5 illustrates the electro-optical characteristics of the liquid crystal device having the above-described structure. For a comparative purpose, the electro-optical characteristics of the conventional TN-LCD and STN-LCD are also given in Table 5. In this case the measured temperature is 25°.

TABLE 5

|  | Prior Art Device | | Present Devices | | | | |
|---|---|---|---|---|---|---|---|
|  | TN-LCD | STN-LCD | Example 7 | Example 8 | Example 9 | Example 10 | Example 11 |
| Liquid Crystal (LC) | I | II | III | III | III | IV | V |
| Twist Angle | 90° | 240° | 240° | 240° | 240° | 240° | 240° |
| Tilt Angle | <3° | 5° | <5° | <5° | <5° | <5° | <5° |
| LC Layer Thickness (μm) | 7.0 | 6.2 | 6.5 | 6.5 | 6.5 | 7.2 | 7.3 |

TABLE 5-continued

|  | Prior Art Device | | Present Devices | | | | |
|---|---|---|---|---|---|---|---|
|  | TN-LCD | STN-LCD | Example 7 | Example 8 | Example 9 | Example 10 | Example 11 |
| $\Delta n \cdot d$ | 1.0 | 0.92 | 0.63 | 0.63 | 0.63 | 0.77 | 0.68 |
| Position of Polarizing Plate | Nega. | Posi. | FIG. 17 | FIG. 17 | FIG. 17 | FIG. 18 | FIG. 15 |
| Duty Ratio | 1/60 | 1/120 | 1/120 | 1/120 | 1/120 | 1/120 | 1/120 |
| Bias Ratio | 1/8.7 | 1/12 | 1/12 | 1/7 | 1/12 | 1/12 | 1/12 |
| Frame Frequency | 60 Hz | 60 Hz | 60 Hz | 60 Hz | 120 Hz | 120 Hz | 120 Hz |
| Vth (V) | 13.4 | 17.3 | 36.0 | 26.8 | 36.4 | 33.2 | 31.5 |
| Contrast Ratio | 11 | 10 | 12 | 21 | 24 | 20 | 19 |

Vth in Table 5 is an operation voltage which provides the maximum contrast for each device.

Table 6 shows the material values of the nematic liquid crystals used in the above examples. Referring to Table 6, the liquid crystals I and II are used in the TN-LCD and STN-LCD in Table 5, while the liquid crystals III to V are used in the examples in Table 5.

TABLE 6

| Material Value | LC I | LC II | LC III | LC IV | LC V |
|---|---|---|---|---|---|
| S-N Point (°C.) | <−5 | <−5 | <−5 | <−5 | <−5 |
| N-I Point (°C.) | 60 | 85 | 82 | 81 | 87 |
| Viscosity (cP) | 20 | 30 | 45 | 26 | 13 |
| $\Delta n$ ($\lambda$ = 545 nm) | 0.144 | 0.148 | 0.097 | 0.107 | 0.093 |
| $\Delta\epsilon/\epsilon\perp$ | 1.3 | 2.4 | <1.0 | <1.0 | <1.0 |

As shown in Table 5, the examples of the present invention provide a higher contrast, as compared with the conventional TN-LCD and STN-LCD, prevents coloring of the transmitting light, and can be driven at a high duty in multiplex manner.

The examples 7 and 8 use the same liquid crystal device which are, however, driven by drive signals of different bias ratios. The example 8 in which the bias ratio is 1/7 provides a significantly high contrast.

Further, the example 9 is a case where the same liquid crystal device as used in the example 7 is driven by a drive signal having a frame frequency twice (120 Hz) as high as that of the example 7. If the frame frequency is set high as in this example, the contrast is very high. Increasing the bias ratio and/or increasing the frame frequency reduce the amount of leak light during a non-select period. It is therefore possible to significantly improve the contrast by prominently decreasing the transmittivity at the OFF time.

In the example 10, the optical anisotropy $\Delta n$ of the liquid crystal in use is slightly increased ($\Delta n$ for the liquid crystal IV is 0.107; see Table 6), the thickness d of the liquid crystal layer is also slightly increased to thereby slightly increase the retardation $\Delta n \cdot d$. In this case, if the proper positions of the polarizing plates are selected in accordance with the retardation $\Delta n \cdot d$ as shown in FIG. 18, the contrast can be increased to as high as 20. To increase the retardation $\Delta n \cdot d$, it is desirable that a liquid crystal having as large an optical anisotropy $\Delta n$ as possible be used while satisfying the aforementioned condition of the present invention. If the optical anisotropy $\Delta n$ is large, the thickness d of the liquid crystal layer can be small accordingly, making it advantageous in providing good responsibility. In order to prevent coloring of transmitting light, however, it is desirable that $\Delta n$ be small. Therefore, $\Delta n$ can be properly selected depending on whether a good response or prevention of coloring of transmitting light is more important.

In the example 11, the liquid crystal V having a small optical anisotropy $\Delta n$ (=0.093; see Table 6) is used, the positions of the polarizing plates are properly selected in accordance with the retardation $\Delta n \cdot d$ as known in FIG. 18, and the liquid crystal device is driven at a frame frequency of 120 Hz. According to the example 11, even with a smaller twist angle (200°) than that of the conventional STN-LCD, a significantly high contrast (contrast ratio of 19) can be attained as compared with the STN-LCD.

The liquid crystal devices according to the individual embodiments are free of coloring of transmitting light and have a high transmittivity in ON state, so that they can display a sufficiently bright image.

What is claimed is:

1. A liquid crystal device comprising:

a first substrate having a plurality of first electrodes arranged thereon;

a second substrate having at least one second electrode arranged thereon, said second electrode facing said first electrodes, said second substrate being connected to said first substrate by means of a seal member to face said first substrate with a predetermined gap therebetween;

first aligning means for covering at least parts of surfaces of said first electrodes and at least a part of a surface of said first substrate and aligning molecules of a liquid crystal homogeneously in a first direction;

second aligning means for covering at least a part of a surface of said at least one second electrode and at least a part of a surface of said second substrate and aligning molecules of said liquid crystal homogeneously in a second direction differing 0° to 90° from said first direction toward a predetermined first rotational direction, as viewed in a traveling direction of transmitting light;

a nematic liquid crystal disposed between said first and second substrates, and having an optical anisotropy $\Delta n$, with respect to light having a wavelength of 540–550 nm, of 0.12 or below, a positive dielectric anisotropy $\Delta\epsilon$, a dielectric ratio $\Delta\epsilon/\epsilon\perp$ of 1.0 or below, expressed by ratio of a dielectric anisotropy $\Delta\epsilon$ to a dielectric constant $\epsilon\perp$ normal to a molecular axis, and a retardation $\Delta n \cdot d$ of greater than 0.4 $\mu$m and less than 1.0 $\mu$m, expressed by a product of said optical anisotropy $\Delta n$ and a liquid crystal thickness d, said nematic liquid crystal being twisted 180° to 270° between said first and second aligning means in said first rotational direction as viewed in said traveling direction of said transmitting light; and a pair of polarizing plates disposed outside a layer of said nematic liquid crystal.

2. A liquid crystal device according to claim 1, wherein said nematic liquid crystal has a layer thickness of greater than or equal to 4 μm and less than or equal to 9 μm.

3. A liquid crystal device according to claim 1, wherein said nematic liquid crystal has a dielectric ratio $\Delta\epsilon/\epsilon\perp$ of 0.5 or below, which is expressed by a ratio of a dielectric anisotropy $\Delta\epsilon$ to a dielectric constant $\epsilon\perp$.

4. A liquid crystal device according to claim 1, wherein at least one of said first and second aligning means includes an aligning film for aligning liquid crystal molecules at a proximity of a surface of said aligning film, at a pre-tilt angle of 5° or below with respect to said surface, and said surface of said aligning film is subjected to surface treatment for rubbing said surface in a predetermined direction.

5. A liquid crystal device according to claim 1, wherein said pair of polarizing plates comprises a first polarizing plate disposed outside said layer of said nematic liquid crystal on a side of said first aligning means and having a polarizing axis in a direction crossing the first direction at 180° to 115° in a rotational direction opposite to said first rotational direction, as viewed from said traveling direction of said transmitting light; and a second polarizing plate disposed outside said layer of said nematic liquid crystal on a side of said second aligning means and having a polarizing axis in a direction crossing a direction of said polarizing axis of said first polarizing plate at 90° to 20° in said first rotational direction, as viewed from said traveling direction of said transmitting light.

6. A liquid crystal device according to claim 1, wherein said polarizing axes of said polarizing plates are light-transmitting axes.

7. A liquid crystal device according to claim 1, wherein said second aligning means is subjected to aligning treatment for aligning molecules of said nematic liquid crystal in said second direction crossing said first direction at 0° to 60° in said first rotational direction, as viewed from said traveling direction of said transmitting light in order to twist said molecules of said nematic liquid crystal 180° to 240°, thereby permitting said nematic liquid crystal to be twisted 180° to 240° between said first and second aligning means in said first rotational direction as viewed from said traveling direction of said transmitting light.

8. A liquid crystal device according to claim 1, wherein said second aligning means is subjected to aligning treatment for aligning molecules of said nematic liquid crystal in said second direction crossing said first direction at 60° in said first rotational direction, as viewed from said traveling direction of said transmitting light in order to twist said molecules of said nematic liquid crystal 240°; and said pair of polarizing plates comprises a first polarizing plate disposed outside said layer of said nematic liquid crystal on a side of said first aligning means and having a polarizing axis in a direction crossing said first direction at 135° to 152.5° in a rotational direction opposite to said first rotational direction with respect to a direction of said polarizing axis of said first polarizing plate, as viewed from said traveling direction of said transmitting light; and a second polarizing plate disposed outside said layer of said nematic liquid crystal on a side of said second aligning means and having a polarizing axis in a direction crossing said direction of said polarizing axis of said first polarizing plate at 60° to 22.5° in said first rotational direction, as viewed from said traveling direction of said transmitting light.

9. A liquid crystal device according to claim 1, wherein said second aligning means is subjected to aligning treatment for aligning molecules of said nematic liquid crystal in said second direction crossing said first direction at 20° in said first rotational direction, as viewed from said traveling direction of said transmitting light in order to twist said molecules of said nematic liquid crystal 200°; and said pair of polarizing plates comprises a first polarizing plate disposed outside said layer of said nematic liquid crystal on a side of said first aligning means and having a polarizing axis in a direction crossing said first direction at 165° to 150° in a rotational direction opposite to said first rotational direction with respect to a direction of said polarizing axis of said first polarizing plate, as viewed from said traveling direction of said transmitting light; and a second polarizing plate disposed outside said layer of said nematic liquid crystal on a side of said second aligning means and having a polarizing axis in a direction crossing said direction of said polarizing axis of said first polarizing plate at 80° to 50° in said first rotational direction, as viewed from said traveling direction of said transmitting light.

10. A liquid crystal device according to claim 1, wherein said second aligning means is subjected to aligning treatment for aligning molecules of said nematic liquid crystal in said second direction parallel to and in a same direction as said first direction, as viewed from said traveling direction of said transmitting light in order to twist said molecules of said nematic liquid crystal 180°; and said pair of polarizing plates comprises a first polarizing plate disposed outside said layer of said nematic liquid crystal on a side of said first aligning means and having a polarizing axis in a direction crossing said first direction at 180° to 160° in a rotational direction opposite to said first rotational direction, as viewed from said traveling direction of said transmitting light; and a second polarizing plate disposed outside said layer of said nematic liquid crystal on a side of said second aligning means and having a polarizing axis in a direction crossing said first direction at 90° to 110° in a rotational direction opposite to said first rotational direction, as viewed from said traveling direction of said transmitting light.

11. A liquid crystal device according to claim 10, wherein said nematic liquid crystal has a retardation $\Delta n \cdot d$ of greater than 0.5 μm and less than 0.7 μm, which is expressed by a product of an optical anisotropy $\Delta n$ and a liquid crystal layer thickness d.

12. A liquid crystal device according to claim 1, further comprising multiplex driving means for applying a drive signal having a bias ratio higher than $1/\sqrt{N+1}$ (N: number of time divisions), to a plurality of portions of said nematic liquid crystal which are sandwiched between those portions of said first and second electrodes which intersect with one another.

13. A liquid crystal device according to claim 12, wherein said number of time divisions N is 120, and said bias ratio is 1/9.

14. A liquid crystal device according to claim 12, wherein said number of time divisions N is 120, and said bias ratio is 1/7.

15. A liquid crystal device according to claim 1, further comprising multiplex driving means for applying, to a plurality of said nematic liquid crystal which are sandwiched between those portions of said first and second electrodes intersect one another, a drive signal having a frame frequency for repetitively selectively driving said plurality of portions, said frame frequency being greater than a number of time divisions.

16. A liquid crystal device according to claim 15, wherein said frame frequency is an integer multiple of said number of time divisions.

17. A liquid crystal device according to claim 16, wherein said frame frequency is twice said number of time divisions.

18. A liquid crystal device according to claim 8, further comprising multiplex driving means for applying, to a plurality of portions of said nematic liquid crystal which are sandwiched between those portions of said first and second electrodes intersect one another, a drive signal having a higher bias ratio than $1/\sqrt{N+1}$ (N: number of time divisions) and having a frame frequency for repetitively selectively driving said plurality of portions, said frame frequency being greater than a number of time divisions, N.

* * * * *